March 30, 1926.
H. CAMINEZ
PISTON CONSTRUCTION FOR CAM ENGINES
Filed Dec. 14, 1925
1,578,877
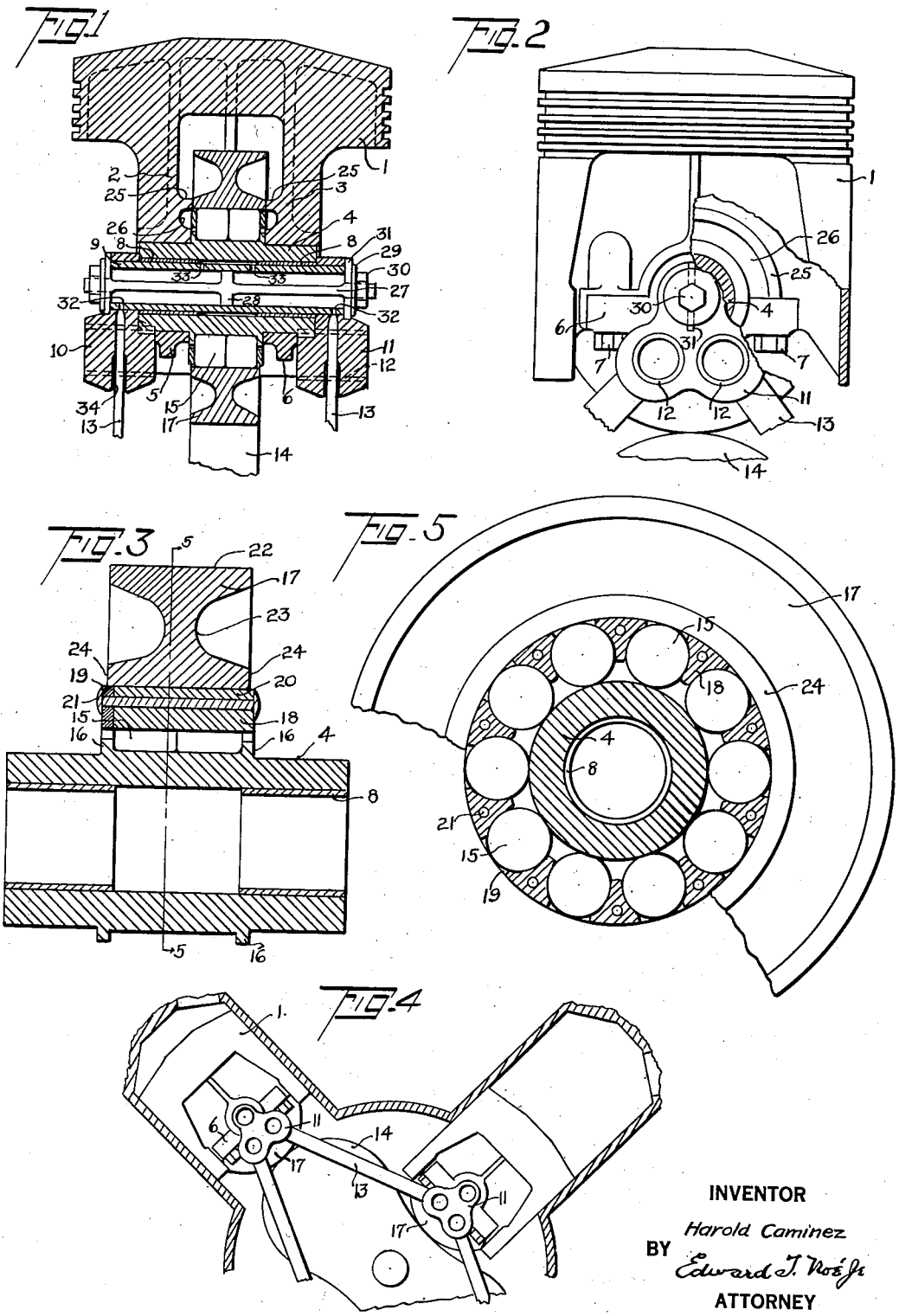
INVENTOR
Harold Caminez
BY Edward J. Noé Jr
ATTORNEY Patented Mar. 30, 1926.

1,578,877

UNITED STATES PATENT OFFICE.

HAROLD CAMINEZ, OF FARMINGDALE, NEW YORK.

PISTON CONSTRUCTION FOR CAM ENGINES.

Application filed December 14, 1925. Serial No. 75,281.

*To all whom it may concern:*

Be it known that I, HAROLD CAMINEZ, a citizen of the United States, residing in the county of Nassau, village of Farmingdale, State of New York, have invented certain new and useful Improvements in Piston Constructions for Cam Engines, of which the following is a specification.

This invention relates to cam engines in which the explosive force in radially arranged cylinders operates upon a central cam so as to cause revolution of the drive shaft, the pistons in the cylinders being interconnected by links so as to maintain a bearing relation with the cam.

The primary object of the invention is the provision of a novel piston construction which provides a pair of link attaching members which are mounted upon the piston pin and which are interconnected rigidly together so as to operate in unison and through equal degrees.

A further object is the provision of a roller-bearing inner race member which is mounted in the piston and which forms a mount for the piston pin. The outer race member of the roller-bearing is located by webs provided in the piston, and these webs are provided with an oil groove which catches the oil and supplies it to the rollers.

A further object of the invention is the provision of an outer roller-bearing race member, which is very materially reduced in size between the roller race and its cam engaging peripherical surface, so that the peripherical surface of the member will contact with the cam throughout its entire width by reason of the slight resiliency thus provided.

Other objects and advantages of the invention will be more fully set forth in the following specification and in the drawings, in which—

Fig. 1 is a central section through the piston constructon.

Fig. 2 is a side view thereof.

Fig. 3 is an enlarged sectional view taken through the center of the roller-bearing.

Fig. 4 is a central section through a part of a cam engine utilizing the novel piston system; and Fig. 5 is a section on the line 5—5 of Fig. 3.

Referring more particularly to the drawings by reference numerals, the piston body 1 is provided integrally with the two main web portions 2 and 3 in which is mounted the inner roller-bearing race member 4 by means of the detachable lower clamp members 5 and 6 which are bolted to the webs by means of the bolts 7 so as to mount the member 4 fixed within the piston. Fixed within the member 4 are two bushings 8 which form a bearing for the piston pin 9. At the ends of the piston pin are the two link connecting members 10 and 11, each of which is provided with a pair of short pins 12, upon which the links 13 are oscillatably mounted. These links interconnect adjacent piston assemblies as more fully set forth in my prior application for cam engines, Serial No. 703,211 filed March 31st, 1924. The piston assemblies are thus constrained to engage with the cam at all times (see Fig. 4) so as to cause a revolution of the cam as the charges within the cylinders are successively exploded.

A series of rollers 15 are arranged around the inner race member 4, which is provided with the short flanges 16 which locate the rollers therebetween. Upon the rollers is mounted the outer race member designated generally 17. The rollers are arranged in spaced relation and are centered by a centering cage 18 which is centered in the outer race member within which it rotates. This centering cage maintains the rollers in their proper positions regardless of inertia effects as the piston rapidly moves back and forth. The rollers are thus permitted to always assume the load and prevent friction between the rotating parts. The centering cage, as shown, is provided with an end disc 19 which is riveted to the main body portion of the cage by the rivets 21. The outer race member 17 is provided with a cam engaging peripheral surface 22 which rolls upon the cam 14 when the motor is in operation. Between the surface 22 and the roller contacting inner surface, the member 17 is very materially restricted in width, as indicated at 23, so that a slight flexibility is given to it to permit the surface 22 to contact throughout its full width with the cam 14, by reason of this slight flexibility. The side portions 24 of the member 17 bear against the semi-circular ridges or projections 25 of the piston webs 2 and 3, which thus locates the outer roller-bearing race between them.

Directly adjacent to the series of rollers 15, is a hemispherical groove 26 in each of the webs 2 and 3, these grooves being partly defined by the projections 25. The grooves are open at their lower ends, since the detachable clamp members 5 and 6 are of smaller width than the webs of the piston and oil is thus collected in the grooves and supplied to the upper portion of the series of rollers, it being understood that the projections 25 in the webs prevent the loss of the oil in the down stroke of the piston, except to the rollers.

As previously stated, the link connecting members 10 and 11 are fitted upon the ends of the piston pin. Passing through the center of the pin is a rod 27 which is provided at its center with a ring 28 which slidingly fits within the piston pin so as to center the rod therein. The opposite ends of the rod are threaded and the link connecting members 10 and 11 are held in place on the piston pins by the washers 29 and nuts 30. A key 31 is provided adjacent each end of the rod 27, and fits within key slots in both the piston pin and the link connecting members 10 and 11. The link connecting members 10 and 11 are thus rigidly interconnected together so that they must move simultaneously in synchronism. With such an arrangement the piston roller member 17 will always maintain a true bearing relation with the cam throughout the entire width of the surface 22 and of the cam. This will be true since the piston will not be permitted to move about its own vertical axis of symmetry and the pairs of links attached to the opposite sides of the piston will always be maintained parallel.

The piston pin is provided with oil holes 32 which supply oil through other oil holes 33 to the space between the bushings 8 so as to form an oil supply for the surface of the piston pin where it is movably mounted within the bushings 8. Oil is supplied to the holes 32 through oil pockets 34 in the link connecting members 10 and 11, as shown in Fig. 1.

I am aware that various modifications may be made without departing from the scope of my invention, which is herein shown in its preferred form, and I do not intend that I should be limited to the precise construction which has been chosen herein.

I claim:

1. In a cam engine having link connected pistons co-operating with a central cam, in combination, a piston, a piston pin therefor, a plurality of members on said pin, to which the links are attached, and means for attaching said members rigidly together so that they may oscillate in unison about the piston pin axis.

2. In a cam engine having link connected pistons, cooperating with a central cam, in combination, a piston, a piston pin therefor, a pair of members mounted on said piston pin, means for attaching said members to the links, and means within said pin for rigidly interconnecting said pair of members together.

3. In a piston construction for cam engines, in combination, a piston body, a piston pin mounted therein, a pair of link connecting members oscillatably mounted one at each end of said pin, and means connecting said members rigidly together.

4. In a piston construction for cam engines, in combination, a piston body, a piston pin oscillatably mounted therein between its ends, a pair of link connecting members oscillatably mounted one at each end of said pin, and means connecting said members rigidly together.

5. In a piston construction for cam engines of the class described, in combination, a piston body, a piston pin oscillatably mounted between its ends in said piston body, a pair of members mounted on said piston pin one adjacent each end thereof and adapted to be connected to links, a longitudinal rod within said pin and a key rigid with said rod at each end thereof to interconnect the pin, members and rod rigidly together.

6. In a piston construction for cam engines of the class described, in combination, a piston body having a pair of webs, an inner roller-bearing race fixed in said webs, a piston pin oscillatably mounted within said race, and a link attaching member mounted on each end of said pin for simultaneous synchronous pivotal movement about the piston pin axis.

7. In a piston construction for cam engines of the class described, in combination, a piston body having a pair of webs, an inner roller-bearing race mounted fixed in said webs, a piston pin oscillatably mounted within said race, a link attaching member adjacent each end of said pin, a series of rollers engaging said race, an outer bearing race supported on said rollers between said webs and adapted to engage the cam, and a centering cage for said rollers, rotatably mounted in said outer bearing race.

8. In a piston construction for cam engines of the class described, in combination, a piston body having a pair of webs, an inner roller-bearing race mounted in said webs, a piston pin mounted in said race, link attaching members on said pin, a series of rollers engaging said race, an outer cam engaging bearing race supported on said rollers and located by said webs, and a centering cage for said rollers rotatably mounted in and centered by said outer bearing race.

9. In a piston construction for cam engines of the class described, in combination, a piston body having a pair of webs, an inner roller-bearing race mounted in said webs, a piston pin mounted in said race, link attaching members on said pin, an outer roller-bearing race member between said webs and having a wide cam engaging peripheral surface, the outer roller-bearing race member being very materially reduced in size between the roller race and the cam engaging peripheral surface.

10. In a piston construction for cam engines of the class described, in combination, a piston body having a pair of webs, an inner roller-bearing race mounted in said webs, an outer roller-bearing race member between and located by said webs and having a wide cam engaging peripheral surface, the outer roller bearing race member being very materially reduced in size between the roller race and the cam engaging peripheral surface for the purpose described.

11. In a piston construction for cam engines of the class described, in combination, a piston body having a pair of webs, an inner roller-bearing race mounted in said webs, an outer roller-bearing race member between and located by said webs and having a wide cam engaging peripheral surface, the outer roller-bearing race member being very materially reduced in size between the roller race and the cam engaging peripheral surface for the purpose described, and a roller centering cage rotatably mounted in said race member.

12. In a piston construction for cam engines of the class described, in combination, a piston body having a pair of spaced webs, an inner roller-bearing race mounted in said webs, a series of rollers for said race, an outer roller bearing race located by said webs and supported by said rollers, a roller centering cage rotatably mounted in and centered by said outer race, and a groove in each web concentric with and adjacent to said series of rollers.

13. In a piston construction for engines of the class described, in combination, a piston body having a pair of spaced parallel webs, an inner roller-bearing race mounted in said webs, a series of spaced rollers fixed in said webs, a series of spaced rollers for said race, an outer roller-bearing race located between said webs and supported by said rollers, an annular bearing portion on each of said webs to locate the outer bearing race, and a semi-circular groove in the upper part of each of said webs, partly defined by said bearing portion, concentric with and adjacent to said series of rollers for conducting oil to the rollers.

14. In a piston construction for cam engines of the class described, in combination, a piston body having a pair of spaced parallel webs, an inner roller-bearing race fixed in said webs, a piston pin oscillatably mounted with said race, a link connecting member on each end of said pin, means rigidly connecting said members together for simultaneous movement together about the piston pin axis, a series of spaced rollers for said race, an outer roller-bearing race located between said webs and supported by said rollers, an annular bearing portion on each of said webs to locate the outer bearing race, and a semi-circular groove in each of said webs concentric with and adjacent to said series of rollers for conducting oil to the rollers.

In testimony whereof I have hereunto set my hand this ninth day of December, 1925.

HAROLD CAMINEZ.